US010870086B2

(12) United States Patent
Thieme et al.

(10) Patent No.: US 10,870,086 B2
(45) Date of Patent: Dec. 22, 2020

(54) POLYMERIC MEMBRANES

(71) Applicant: Global Life Sciences Solutions Germany GmbH, Dassel (DE)

(72) Inventors: Marcel Thieme, Dassel (DE); Klaus Hochleitner, Dassel (DE); Suzana Kiel, Dassel (DE); Alexander Schenk, Dassel (DE); Wolfgang Thamm, Dassel (DE); Daniela Katarzynski, Dassel (DE); Georg Peter Danisch, Dassel (DE)

(73) Assignee: Global Life Sciences Solutions Germany GmbH, Dassel (DE)

( * ) Notice: Subject to any disclaimer, the term of this patent is extended or adjusted under 35 U.S.C. 154(b) by 0 days.

(21) Appl. No.: 15/562,663

(22) PCT Filed: Mar. 24, 2016

(86) PCT No.: PCT/EP2016/056667
§ 371 (c)(1),
(2) Date: Sep. 28, 2017

(87) PCT Pub. No.: WO2016/156250
PCT Pub. Date: Oct. 6, 2016

(65) Prior Publication Data
US 2018/0104655 A1 Apr. 19, 2018

(30) Foreign Application Priority Data
Mar. 30, 2015 (GB) .................................. 1505417.4

(51) Int. Cl.
*B01D 67/00* (2006.01)
*B01D 65/02* (2006.01)
(Continued)

(52) U.S. Cl.
CPC ......... *B01D 67/0088* (2013.01); *B01D 65/02* (2013.01); *B01D 67/0009* (2013.01);
(Continued)

(58) Field of Classification Search
CPC ............... B01D 67/0088; B01D 71/20; B01D 67/0013; B01D 65/02; B01D 71/14;
(Continued)

(56) References Cited

U.S. PATENT DOCUMENTS 5,460,777 A * 10/1995 Kitajima .............. G01N 33/491
422/422
5,979,669 A * 11/1999 Kitajima ............ B01D 39/2017
210/455

(Continued)

FOREIGN PATENT DOCUMENTS

CN 104437142 A 3/2020
EP 0421234 A2 * 4/1991 ........... G01N 33/548
(Continued)

OTHER PUBLICATIONS

PCT International Search Report and Written Opinion for PCT Application No. PCT/EP2016/056667 dated Jul. 1, 2016 (11 pages).

(Continued)

*Primary Examiner* — Pamela H Weiss
(74) *Attorney, Agent, or Firm* — Eversheds Sutherland (US) LLP

(57) ABSTRACT

Disclosed is a method and apparatus for manufacturing a continuous web of polymeric membrane and for continuous downstream processing of said web. The apparatus (10) comprises: a casting station (20) for casting the continuous web (M); a carrier (24) for carrying the web downstream; a membrane drier (30) downstream of the carrier, for drying the web; and a brushing station (40) downstream of the drier for brushing the web. Said drier is located immediately (Continued)

downstream of the carrier, and upstream of said brushing station. The apparatus (10) further includes an additional drying station (50) downstream of the brushing station (40). Brushing after drying retains more surfactant in the membrane which is useful for certain applications. In addition, initial drying eliminates virtually all solvents from the membrane, but leaves some non-solvent (e.g. water) within it, which in turn fixes the surfactant on the nitrocellulose fibers, which improves significantly the consistency and reproducibility of the membrane.

8 Claims, 2 Drawing Sheets

(51) Int. Cl.
*B01D 71/14* (2006.01)
*B01D 71/20* (2006.01)

(52) U.S. Cl.
CPC ..... *B01D 67/0013* (2013.01); *B01D 67/0095* (2013.01); *B01D 71/14* (2013.01); *B01D 71/20* (2013.01); *B01D 2321/30* (2013.01); *B01D 2323/08* (2013.01); *B01D 2323/42* (2013.01)

(58) Field of Classification Search
CPC ............ B01D 67/0095; B01D 67/0009; B01D 2323/42; B01D 2323/08; B01D 2321/30
See application file for complete search history.

(56) References Cited

U.S. PATENT DOCUMENTS

| | | | |
|---|---|---|---|
| 5,980,746 A * | 11/1999 | Gelman | B01D 67/0018 210/500.27 |
| 7,807,475 B2 * | 10/2010 | Beer | B01D 67/0009 210/500.29 |
| 7,807,476 B2 | 10/2010 | Beer et al. | |
| 9,707,523 B2 * | 7/2017 | Hochleitner | B01D 71/16 |
| 2002/0119577 A1 | 8/2002 | Beer et al. | |
| 2010/0230843 A1 * | 9/2010 | Ansorge | B01D 67/0011 264/41 |
| 2010/0330691 A1 * | 12/2010 | Beer | B01D 67/0009 436/169 |
| 2015/0027945 A1 | 1/2015 | Hochleitner et al. | |
| 2016/0095876 A1 * | 4/2016 | Salamone | A61K 8/9789 424/43 |

FOREIGN PATENT DOCUMENTS

| | | | |
|---|---|---|---|
| JP | S50-109964 | 8/1975 | |
| JP | H05-297335 | 11/1993 | |
| JP | 2011/017796 A | 1/2011 | |
| WO | WO-2009090174 A1 * | 7/2009 | ............ B01D 71/60 |
| WO | 2013/127709 A1 | 9/2013 | |
| WO | 2014/122094 A1 | 8/2014 | |

OTHER PUBLICATIONS

GB Search Report for GB Application No. 1505417.4 dated Jan. 19, 2016 (5 pages).
Chinese Office Action for CN Application No. 201680019979.4 dated Mar. 11, 2020 (14 pages).
Japanese Non-Final Office Action for JP Patent Application No. 2017-550924 dated Feb. 10, 2020 (7 pages).

* cited by examiner

POLYMERIC MEMBRANES

CROSS REFERENCE TO RELATED APPLICATIONS

This application claims the priority benefit of PCT/EP2016/056667 filed on Mar. 24, 2016 which claims priority benefit of Great Britain Application No. 1505417.4 filed Mar. 30, 2015. The entire contents of which are hereby incorporated by reference herein.

FIELD OF THE INVENTION

The present invention relates to a method for manufacturing a polymeric membrane and apparatus for manufacturing a continuous web of polymeric membrane and for continuous downstream processing of said web, as well as membrane manufactured according to the manufacturing method.

BACKGROUND OF THE INVENTION

Porous dry cast membranes e.g. composed of cellulose esters (e.g. cellulose nitrate, cellulose acetate) are commonly used in diagnostic tests such as line assays, flow through, Western blotting or lateral flow tests. The performance of the tests and even the intensity of visible protein lines may be negatively affected by what are known as dust particles, being composed of small cellulose nitrate particles, formed on the top surface of the membrane. It appears that its formation is dependent on the raw material grades used, and it cannot be prevented during the membrane formation process. A specific challenge in the manufacturing of the corresponding membranes is the removal of this dust. A further challenge is to retain surfactant in the membrane, which improves the manufacturability of the membrane and the performance of the membrane in use, for certain applications.

U.S. Pat. No. 7,807,475 (Beer et al) addresses this problem, and proposes removal of the filter dust by cleansing the cast membrane prior to drying. This document suggests that the cleansing can be undertaken also when the cast membrane is partially dry, i.e. where the membrane still holds between 5 and 20 percent by weight of the original quantity of the solvent or solvent mixture. Thus, Beer et al propose cleansing when the cast membrane has 5 percent or more of its original solvent by weight still in the membrane. This latter option is said to enhance the effectiveness of cleansing by removing not just filter dust, but also impurities within the structure of the membrane, because the structure is more accessible to the cleansing fluids. Cleansing can be by means of mechanical brushing while rinsing with cleansing fluid. Later publication US2010/0330691, by the same inventor, also promotes the use of cleaning prior to drying.

In general, cellulosic membranes are manufactured in the so-called dry-cast process: A solution composed of the polymer, one or several solvents, one or several non-solvents (in most cases water) and perhaps also some additives are mixed and finally cast on a carrier substrate as e.g. a steel or aluminium belt, a plastic belt or a paper. The substrate is transferred into the casting machine whose inner atmosphere is controlled concerning temperature and humidity. Due to the continuous evaporation of the applied solvents in the presence of the non-solvent, a porous polymeric layer, the target membrane, is formed. After leaving the casting machine before drying, the membrane contains remaining water and solvents.

Additives in the form of surfactants can be included in the cast mix. Their presence can tailor the physical and chemical properties of the membrane within the manufacturing process. The inventors have found that the presence of residual surfactant content within the finished membrane has a major impact on the customer application performance, since the surfactant content affects the hydrophilicity of the finished membrane. Hydrophilicity plays a key role in all diagnostic applications of membranes. Also, the surfactant has a key role in enabling the membrane to bind biomolecules, especially proteins in diagnostic and research applications.

However, the prior art cleansing techniques proposed by Beer and mentioned above have been found to have a negative impact on the hydrophilic properties of the membrane treated in accordance with those techniques, principally because of the lower amount of surfactant that remains in the membrane following the prior art cleansing methodologies proposed by Beer et al. Beer et. al. compensate for the surfactant loss by post-treating the wet membrane with a surfactant solution which adds an additional manufacturing step and therefore increases manufacturing costs. The quality variability to the final product may also be affected.

The inventors have devised a technique to remove filter dust from a cast membrane whilst providing an increased amount of surfactant when compared to a similar membrane treated according to the Beer et la process. The membranes processed according to methodologies proposed herein can be used in all kinds of diagnostic or research applications, ranging from Western Blots over lines assays, flow through tests to high end lateral flow tests, all with increased hydrophilicity.

SUMMARY OF THE INVENTION

In an embodiment, the invention provides a method for manufacturing a membrane comprising, in any suitable order, the steps of:

a) providing a membrane casting mixture containing at least a polymer, a polymer solvent, and a surfactant;

b) casting said mix on a carrier;

c) initially drying said mixture, in order to evaporate at least the majority of said solvent and to thereby form a porous polymeric membrane and thereby fixing said surfactant in the membrane; and d) removing particles of dust on the surface of said dried membrane; and e) finally drying the membrane.

In an embodiment, due to the almost complete removal of solvents and remaining water, surfactants are fixed within the membrane structure i.e. the surfactant is immobilised within the polymeric structure. Hence the method according to the invention leads to a reduced loss of surfactant in comparison to the Beer et al process, because the membrane in the Beer et al process is cleansed before drying. In addition, initial drying eliminates. virtually all solvents from the membrane, but leaves some non-solvent (e.g. water) within it, which fixes the surfactant e.g. on the nitrocellulose fibers, which improves significantly the consistency and reproducibility of the membrane.

The invention extends to manufacturing apparatus, and to a membrane manufactured according to the method of the invention or manufactured by the apparatus according to the invention.

The invention extends further to any combination of features disclosed herein, whether or not such a combination is mentioned explicitly herein. Further, where two or more features are mentioned in combination, it is intended that such features may separately form an invention or part of an invention, or may be separated in the claims, without extending the scope of the invention.

BRIEF DESCRIPTION OF THE DRAWINGS

The invention, together with its objects and the advantages thereof, may be understood better by reference to the following description taken in conjunction with the accompanying drawings.

The invention can be put into effect in numerous ways, illustrative embodiments of which are described below with reference to the drawings, wherein:

Referring to FIG. 1, there is shown membrane forming and processing apparatus 10 which is capable of forming a continuous web of membrane material, and continuously processing the web. The apparatus comprises a membrane casting station 20, a membrane drier 30, a dust removal station 40, for example a brushing station, a final drier 50 and a rolling station 60. In this arrangement, the casting station 20 includes a vat 22 containing a liquid mixture of polymer dissolved in a solvent, together with water and a surfactant. In use the liquid mixture is wiped into a moving carrier 24 having a local environment which allows evaporation of the solvent and water, and thereby allowing a porous membrane web M to be formed on the carrier 24, consisting substantially of unevaporated parts of the mixture.

Figure 1:
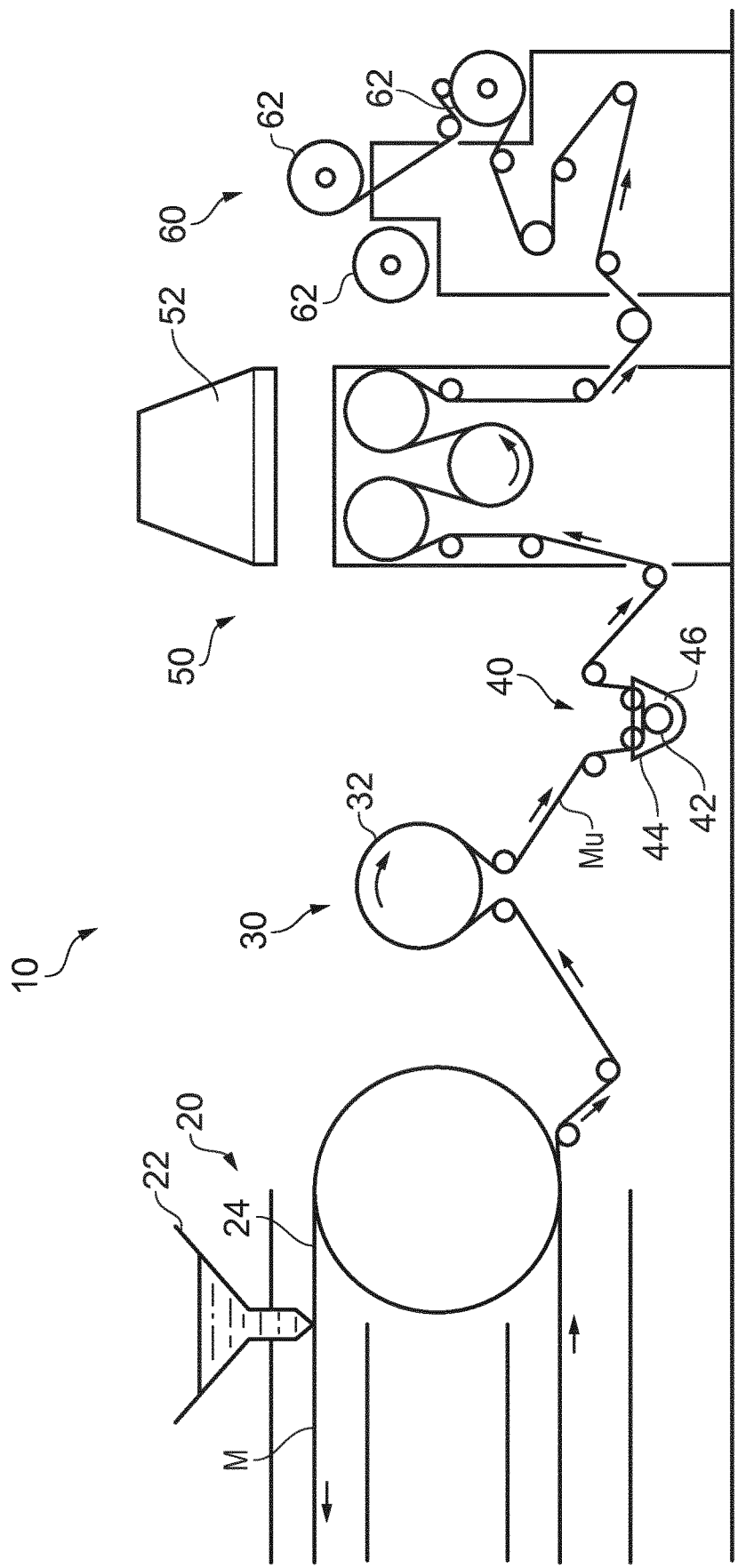
FIG. 1 shows a schematic side view of membrane production apparatus.

In use the membrane M is pulled off the carrier in a continuous web and is pulled in the direction of the arrows through the remainder of the apparatus. The membrane drier 30 includes a drum 32 heated to between 50 and 100 degrees Celsius, which evaporates any residual solvent or water, such that at least 95%, preferably about 98%, of the initial liquids (solvents and water) are removed from the membrane web M. Then the membrane web M travels on to the brushing station 40 at which the underside of the web Mu is bushed by a rotating cylindrical brush head 42, which in turn is located in a tray 44 partially filled with water 46 such that the brush head 42 is partially submerged in use. The underside of the web Mu corresponds to what is called the air side of the web. In other words, Mu is the side of the web which is exposed to the air when it is formed on the carrier 24. This is the useable side of the web. Brushing the underside only of the web means that water or other washing fluid can more readily drip off the web, back into the bath as the web moves out of the brushing station.

Thence, the web M is dried again by a set of drum dryers 50, this time to remove all remaining liquids, such that the membrane is dry. An extractor hood 52 is used to collect any vapours emitted by the web M as it is dried for a second time Then the web is formed into rolls 62 at the rolling station 60. It will be appreciated that various guide rollers are employed to manipulate the web M as shown, but their positon and size are merely illustrative of many possible configurations.

EXAMPLES

The following mixture was used to cast a membrane:
Cellulose nitrate polymer 7% by weight;
Solvent 85.5% by weight;
Water 7.4% by weight; and
Surfactant 0.1% by weight.

Figure 2:
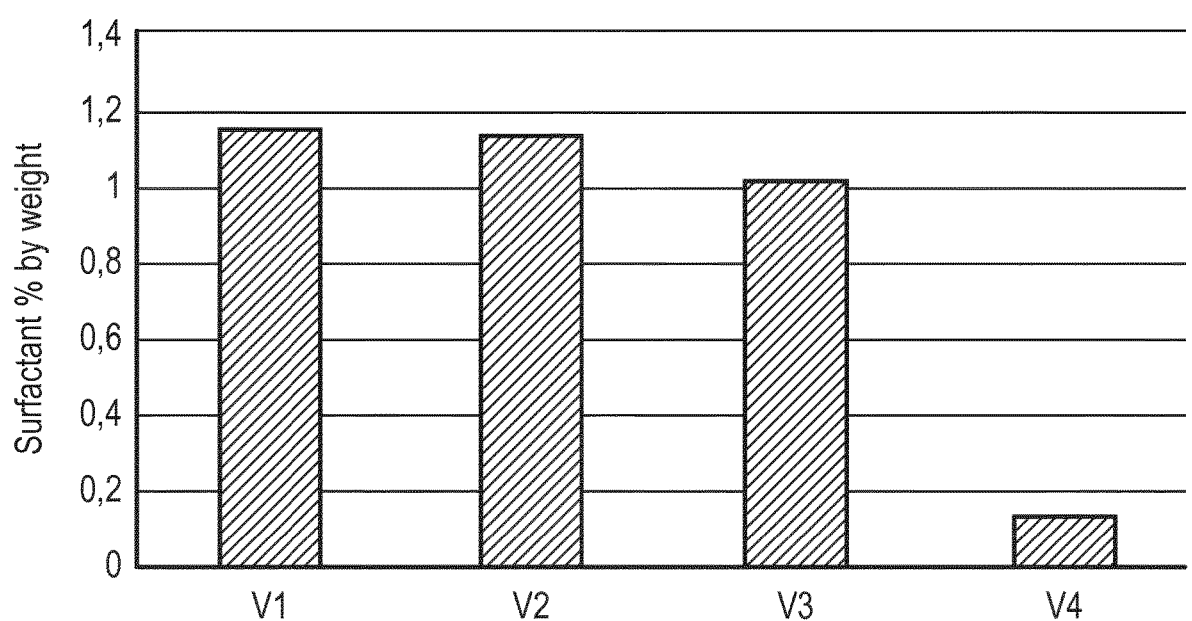
FIG. 2 shows a graph of experimental results.

The cast membrane was subjected to initial drying on a heated drum of the type illustrated (30) at different temperatures, before being brushed in at a brushing station of the type show in FIG. 1 (40). One test run (V1) was made with a heating drum temperature of 68 degrees Celsius, another run (V2) was made at 76 degrees Celsius, and another run (V3) was made at 84 degrees Celsius. For each run V1,2 and 3, the membranes where brushed to remove dust, and finally dried to remove all liquids. For comparison, another test run (V4) was made without attempting the dry the cast membrane before brushing. For each run, an assay of the quantity of surfactant was performed to determine the residual fixed surfactant present after the respective processes were performed. The assay results are shown in FIG. 2, where it can be seen that the membranes from V1, V2 and V3 have significantly more residual surfactant than the V4 process which involved brushing before initial drying took place. Whilst it is marginal the lower temperature drying process of V1 outperformed V2 and V3 in terms of residual surfactant. The inventors have noted that, since drying temperature effects the residual surfactant levels, the drying temperature can thus be used to control the level of surfactant in the finished membrane.

Subsequent experiments have showed that the expected surfactant content for cellulose nitrate membranes whose dust is removed after initial drying, according to the invention is 0.89% minimum and have a typical range of 1.00 to 1.20%, i.e. an average of 1.1% for a drying drum temperature of around 68 degrees Celsius. However, observations of commercially available membranes produced according to the Beer et al process described above show surfactant levels of less than 0.5%. In other words, the process according the invention provides around twice as much residual surfactant in porous cast membranes. Where the surfactant has a beneficial effect in use, e.g. increased hydrophilicity, it can be seen that membrane manufactured according embodiments of the invention, having little or no filter dust, is significantly more useful compared to prior membranes made in a similar way. In addition, the initial drying of the membrane has been found to be important because this eliminates virtually all solvents from the membrane, but leaves some non-solvent (e.g. water) behind (about 32 to 5%), which allows the fixing of the surfactant on the nitrocellulose fibers, improving significantly the consistency and reproducibility of the membrane.

Although embodiments have been described and illustrated, it will be apparent to the skilled addressee that additions, omissions and modifications are possible to those embodiments without departing from the scope of the invention claimed. For example a membrane brushing technique is described in detail above, although removal of surface dust particles could be achieved in other ways such as mechanical wiping or rubbing of the membrane surface for example using a resilient flat blade for example a polymeric wiper blade similar to an automotive windscreen wiper blade, or even directing a jet of liquid at the membrane's surface.

The invention claimed is:

1. A method for manufacturing a nitrocellulose membrane comprising the steps of:
   a) providing a membrane casting mixture containing at least a nitrocellulose polymer, a polymer solvent, and a surfactant;
   b) casting said mixture on a carrier;
   c) initially drying said mixture to allow at least about 98% by weight of the polymer solvent content of the mixture to evaporate during said initial drying thereby fixing said surfactant in the membrane to thereby form a dried porous nitrocellulose polymeric membrane;

d) removing particles of dust on the surface of said dried membrane; and e) following step d) further drying the membrane, wherein the dried membrane has a surfactant content of at least 0.5% by weight.

2. The method of claim 1, wherein said removal of dust particles is by means of physical contact between the membrane and a dust removal member, by means of brushing, wiping or rubbing, or is by means of a flow of liquid.

3. The method of claim 1, wherein said initial drying is performed by means of a heated drum, over which the membrane passes, said drum being heated to at least 50 degrees Celsius.

4. The method of claim 2, wherein said dust removal is by means of brushing and includes rotating a cylindrical brush in a partially filled bath of fluid, and guiding the membrane to make contact with, and pass over an upper part of the rotating brush.

5. The method of claim 1, wherein said further drying includes drying by means of a set of drum dryers.

6. The method of claim 5, further including the later step of rolling said membrane to form a roll.

7. The method of claim 3, wherein said drum is heated to between 50 and 100 degrees Celsius.

8. The method of claim 3, wherein said drum is heated to between 68 and 84 degrees Celsius.

\* \* \* \* \*